(12) United States Patent
Gao et al.

(10) Patent No.: US 9,034,564 B1
(45) Date of Patent: May 19, 2015

(54) READER FABRICATION METHOD EMPLOYING DEVELOPABLE BOTTOM ANTI-REFLECTIVE COATING

(71) Applicant: Western Digital (Fremont), LLC, Fremont, CA (US)

(72) Inventors: Wei Gao, Fremont, CA (US); Miao Wang, San Jose, CA (US); Hai Sun, Milpitas, CA (US); Ming Mao, Dublin, CA (US); Tong Zhao, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/078,389

(22) Filed: Nov. 12, 2013

Related U.S. Application Data

(60) Provisional application No. 61/858,862, filed on Jul. 26, 2013.

(51) Int. Cl.
*G03F 7/20* (2006.01)
*G11B 5/31* (2006.01)

(52) U.S. Cl.
CPC .................................... *G11B 5/3163* (2013.01)

(58) Field of Classification Search
None
See application file for complete search history.

(56) References Cited

U.S. PATENT DOCUMENTS

| | | | |
|---|---|---|---|
| 5,024,896 A | 6/1991 | Mathad et al. | |
| 5,753,418 A * | 5/1998 | Tsai et al. | 430/313 |
| 5,780,161 A | 7/1998 | Hsu | |
| 5,994,226 A | 11/1999 | Kadomura | |
| 6,251,545 B1 | 6/2001 | Levinson | |
| 6,385,018 B1 | 5/2002 | Mukoyama | |
| 6,518,206 B1 | 2/2003 | Kumar et al. | |
| 6,627,355 B2 | 9/2003 | Levinson et al. | |
| 6,667,493 B2 | 12/2003 | Ooshima | |
| 6,692,898 B2 | 2/2004 | Ning | |
| 6,729,014 B2 | 5/2004 | Lin et al. | |
| 6,824,932 B2 | 11/2004 | Bukofsky et al. | |
| 6,861,177 B2 | 3/2005 | Pinarbasi et al. | |
| 6,872,467 B2 | 3/2005 | Qian et al. | |
| 6,983,531 B2 | 1/2006 | Horng et al. | |
| 6,996,894 B2 | 2/2006 | Hsiao et al. | |
| 7,002,781 B2 | 2/2006 | Sugawara | |
| 7,008,550 B2 | 3/2006 | Li et al. | |
| 7,037,850 B2 | 5/2006 | Lee et al. | |
| 7,070,697 B2 | 7/2006 | Freitag et al. | |
| 7,159,304 B2 | 1/2007 | Arasawa et al. | |
| 7,181,828 B2 | 2/2007 | Yazawa et al. | |
| 7,284,316 B1 | 10/2007 | Huai et al. | |
| 7,380,332 B2 | 6/2008 | Bedell et al. | |
| 7,551,408 B2 | 6/2009 | Shimazawa et al. | |
| 7,555,828 B2 | 7/2009 | Breyta et al. | |
| 7,562,436 B2 | 7/2009 | Jayasekara | |
| 7,579,282 B2 | 8/2009 | Rauf et al. | |
| 7,605,006 B2 | 10/2009 | Morijiri et al. | |
| 7,640,650 B2 | 1/2010 | Araki et al. | |
| 7,771,894 B2 | 8/2010 | Wu | |
| 7,824,562 B2 | 11/2010 | Pelhos | |
| 7,869,166 B2 | 1/2011 | Miyauchi et al. | |
| 8,091,210 B1 | 1/2012 | Sasaki et al. | |
| 8,225,488 B1 | 7/2012 | Zhang et al. | |
| 8,233,248 B1 | 7/2012 | Li et al. | |
| 8,313,889 B2 | 11/2012 | Yu et al. | |
| 8,394,280 B1 | 3/2013 | Wan et al. | |
| 2002/0007550 A1 | 1/2002 | Shoji | |
| 2002/0064005 A1 | 5/2002 | Arasawa et al. | |
| 2002/0071224 A1 | 6/2002 | Tagawa et al. | |
| 2002/0195416 A1 | 12/2002 | Nallan | |
| 2004/0018451 A1 * | 1/2004 | Choi | 430/313 |
| 2004/0103524 A1 | 6/2004 | Breyta et al. | |
| 2004/0145836 A1 | 7/2004 | Kojima et al. | |
| 2004/0229430 A1 | 11/2004 | Findeis et al. | |
| 2006/0205158 A1 * | 9/2006 | Kim | 438/263 |
| 2006/0234483 A1 | 10/2006 | Araki et al. | |
| 2007/0023916 A1 | 2/2007 | Hah et al. | |
| 2007/0026538 A1 | 2/2007 | Jayasekara | |
| 2007/0242396 A1 | 10/2007 | Shimazawa et al. | |
| 2008/0007877 A1 | 1/2008 | Takashita et al. | |
| 2008/0020319 A1 * | 1/2008 | Yeh et al. | 430/270.1 |
| 2009/0139958 A1 | 6/2009 | Pentek et al. | |
| 2009/0200264 A1 | 8/2009 | Cyrille et al. | |
| 2010/0308012 A1 | 12/2010 | Yamamoto | |
| 2011/0032645 A1 | 2/2011 | Noel et al. | |
| 2011/0198314 A1 | 8/2011 | Wang et al. | |
| 2012/0298621 A1 | 11/2012 | Gao | |

OTHER PUBLICATIONS

"Kautzky et al., "The Application of Collimated Sputtering to Abutted Junction Reader Processing," datatech, pp. 111-117,published under ""Other Publications"" as cited on U.S. Patent No. 7,070,697 B2, with a patent date of Jul. 4, 2006.".

* cited by examiner

*Primary Examiner* — John A McPherson

(57) ABSTRACT

Disclosed are methods for making read sensors using developable bottom anti-reflective coating and amorphous carbon (a-C) layers as junction milling masks. The methods described herein provide an excellent chemical mechanical polishing or planarization (CMP) stop, and improve control in reader critical physical parameters, shield to shield spacing (SSS) and free layer track width (FLTW).

13 Claims, 8 Drawing Sheets

Prior Art

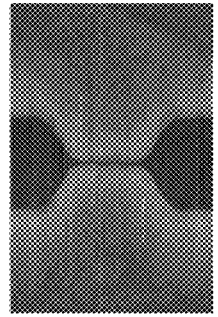
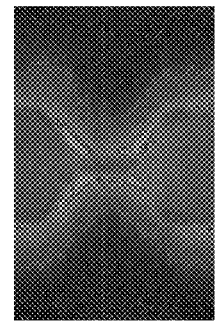
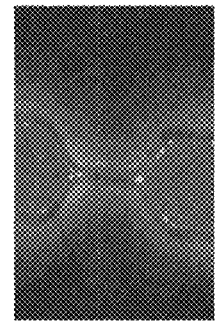
Figure 8

READER FABRICATION METHOD EMPLOYING DEVELOPABLE BOTTOM ANTI-REFLECTIVE COATING

RELATED CASES

This application claims the benefit of U.S. Provisional Application Ser. No. 61/858,862, filed Jul. 26, 2013, which is hereby incorporated herein by reference in the entirety.

BACKGROUND

Computer hard drives store data by affecting the magnetic field of memory cells on a hard drive disk. The stored data is read by passing a read head sensor above a memory cell to respond to, and thus detect, the orientation of the magnetic field in the memory cell. The smaller the memory cells on the hard drive disk, the more densely they can be packed, increasing the density of data storage possible on a hard drive disk.

However, as magnetic media recording density continues to increase, it is necessary for reader sensor geometry to diminish commensurately. As reader sensors become smaller, reader sensor design specifications become more aggressive and the tolerances tighter than those of traditional designs.

Described herein are methods, mill masks and devices resulting therefrom that utilize a developable-soluble bottom anti-reflective coating during the manufacture of reader sensors with very little sensor-to-sensor variability.

BRIEF DESCRIPTION OF THE DRAWINGS

The present application is illustrated by way of example, and not limitation, in the figures of the accompanying drawings in which:

FIGS. 8A, B, and C show SEM images of wafer HALAM post liftoff, post CMP AFM POR, and post a-C removal, respectively.

DETAILED DESCRIPTION

Described herein are methods, mill masks and devices resulting therefrom that utilize a developable-soluble bottom anti-reflective coating during the manufacture of reader sensors or pin portions of a conventional near-field transducer (NFT) in an heat-assisted magnetic recording (HAMR) write transducer, with very little device-to-device variability.

In the following description, numerous specific details are set forth to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

Figure 1:
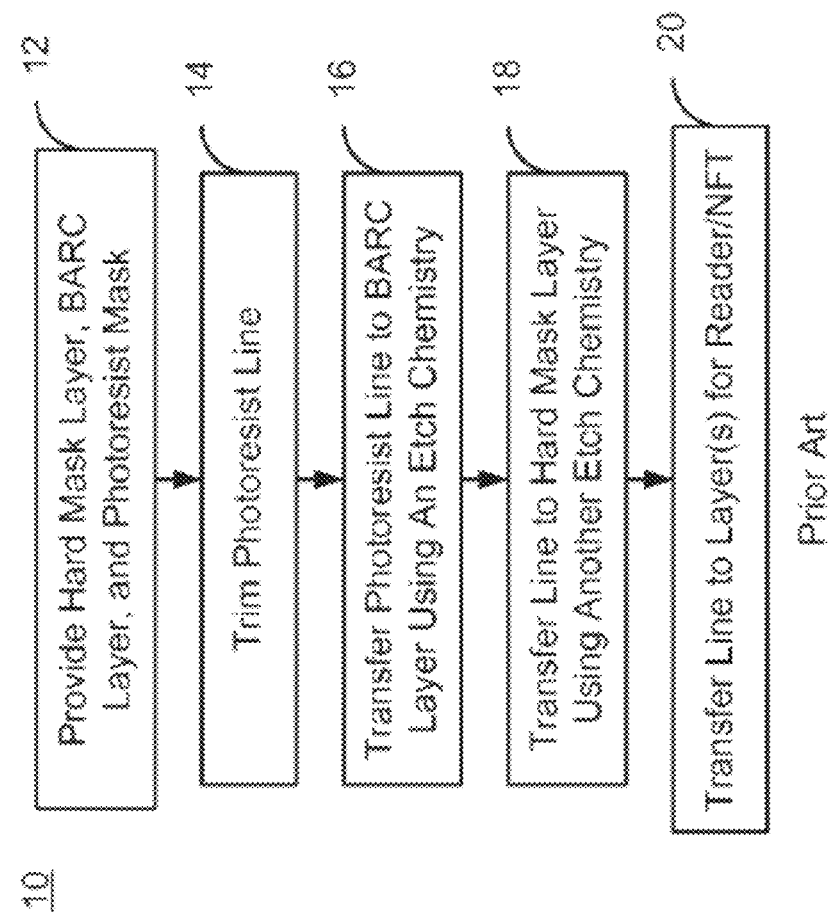
FIG. 1 is a flow chart depicting a conventional method for fabricating a magnetic recording transducer.
Figure 2:
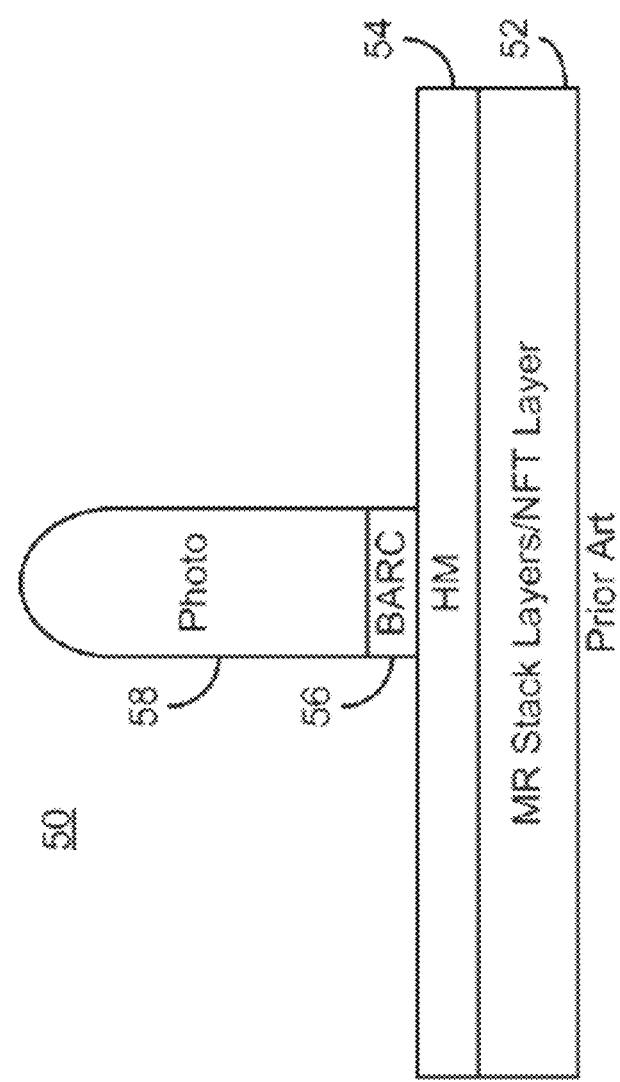
FIG. 2 depicts a conventional magnetic recording transducer during fabrication.
Figure 3:
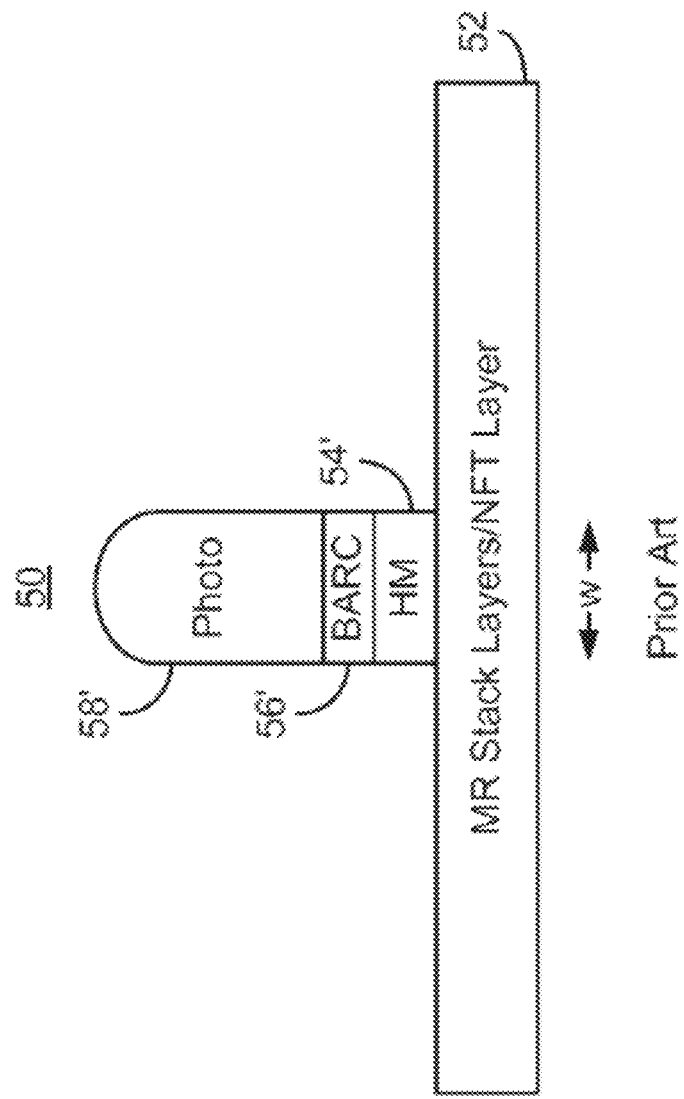
FIG. 3 depicts a conventional magnetic recording transducer during fabrication.

FIG. 1 depicts a conventional method 10 for fabricating a structure in magnetic recording technology applications. FIGS. 2-3 depict a conventional transducer 50 during fabrication using the method 10. The method 10 typically commences after the material(s) for the structure have been deposited. For example, the method 10 may be used in fabricating a conventional magnetoresistive read sensor in a read transducer. Alternatively, the conventional method 10 might be used in fabricating the pin portion of a conventional near-field transducer (NFT) in an energy assisted magnetic recording (EAMR) write transducer.

The conventional method 10 commences by providing a conventional hard mask layer, a conventional non-developable bottom antireflective coating (BARC) layer, and a photoresist mask, via step 12. The conventional non-developable BARC layer aids in patterning of the conventional photoresist mask. For structures such as a conventional magnetoresistive sensor or pin portion of a NFT, the photoresist mask includes a line.

The photoresist line in the conventional photoresist mask is trimmed, via step 14. Typically, an oxygen plasma reactive ion etch (RIE) or other analogous process is used to reduce the width of the photoresist line. The pattern of the photoresist mask is then transferred to the non-developable BARC layer, via step 16. Typically, step 16 is transferred to the non-developable BARC layer using an etch chemistry appropriate to the non-developable BARC layer.

FIG. 2 depicts the conventional transducer 50 after step 16 is performed. The layers 52 for the device 52, hard mask 54, non-developable BARC layer 56, and photoresist mask 58 are shown. If a conventional magnetoresistive structure is to be formed, the stack of layers 52 typically includes an antiferromagnetic (AFM) layer, a pinned layer, a nonmagnetic spacer layer, and a free layer. In addition, seed and/or capping layers may be used. The conventional layers 52 reside on an underlayer (not shown), which may be a substrate. The conventional hard mask layer 54 is typically a material such as SiC or diamond-like carbon (DLC). The non-developable BARC layer 56 is typically an organic BARC, such as AR3. Also shown is the photoresist mask 58. The line potion of the photoresist mask 58 is shown. Because step 16 has been performed, the non-developable BARC 56 has the same width as the photoresist line 58.

A conventional hard mask is defined from the hard mask layer 54, via step 18. Stated differently, the line/pattern of the conventional photoresist mask 58 and non-developable BARC 56 is transferred to the hard mask layer 54. Step 18 typically includes performing an RIE appropriate to the material used for the hard mask 54.

FIG. 3 depicts the conventional transducer 50 after step 18 is carried out. Thus, the conventional hard mask 54' has the pattern of the photoresist mask 58' and non-developable BARC layer 56'. The hard mask 54' thus has the same width, w, as the non-developable BARC 56' and photoresist line 58'. As can be seen in FIG. 3, a portion of the photoresist 58' remains after step 18 is performed.

The structure is defined via step 20. Step 20 typically includes ion milling the transducer 50 or performing an RIE. Thus, the portion of the magnetoresistive stack or NFT layer 52 exposed is removed. The photoresist 58' remaining after step 18 aids in performing step 20. In particular, the photoresist 58' aids in ensuring that the desired portion of the underlying device layer(s) 52 remain covered. Some or all of the photoresist 58' may be consumed in step 20. Fabrication of the conventional transducer 50 may then be completed.

Although the conventional method 10 allows the conventional transducer 50 to be fabricated with line widths below one hundred nanometers, there are several drawbacks. The current trend is to higher density recording and, therefore, smaller track widths. The width of the structure to be fabricated is thus desired to be reduced. To do so, the width, w, of the mask 54', 56', and 58' are also desired to be decreased. For example, in some applications, the width of the structure desired to be fabricated from the hard mask 54' may be lower than fifty nanometers. The conventional method 10 may not be capable of fabricating a line at such small widths. For example, the photoresist line 58' is typically quite thick—on the order of 0.2 microns or more. When such a thick resist line has such a narrow width, the resist line may bend or fall during fabrication. Alternatively, the photoresist line 58' may have a large footing. As a result, there may be large variation in the width of the structure fabricated from the layers 52 and a large wafer to wafer variation. Such variations are undesirable.

Figure 4:
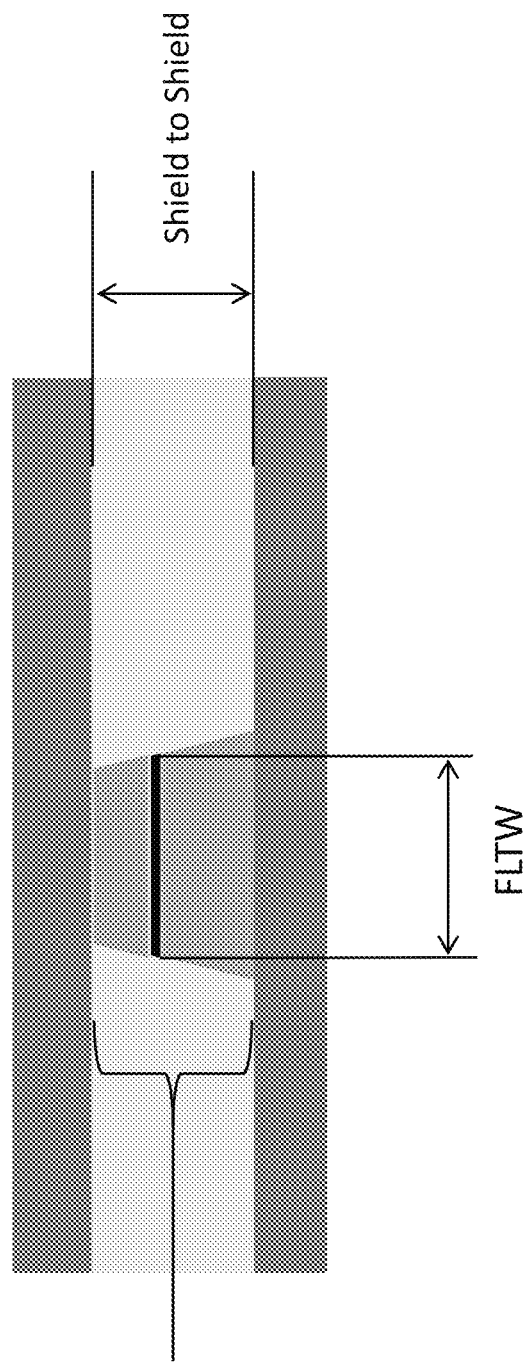
FIG. 4 is an illustration of an exemplary reader, with FLTW and shield-to-shield spacing (SSS) labeled.

One critical parameter in measuring variability is shield-to-shield spacing (SSS) (shown in FIG. 4). The methods described herein are useful for the production of read sensors or NFT layers with very little variation in surface conditions (e.g., as measured by shield-to-shield spacing). This is accomplished through the use of a developable-soluble bottom anti-resistive coating in the formation of a mill mask. As described in greater detail below, use of such a material according to methods provided herein allows for preparation of a mill mask that includes amorphous carbon (a-C). Use of a-C as a mill mask provides improved protection against inconsistent or over-polishing via chemical-mechanical planarization (CMP).

Figure 5:
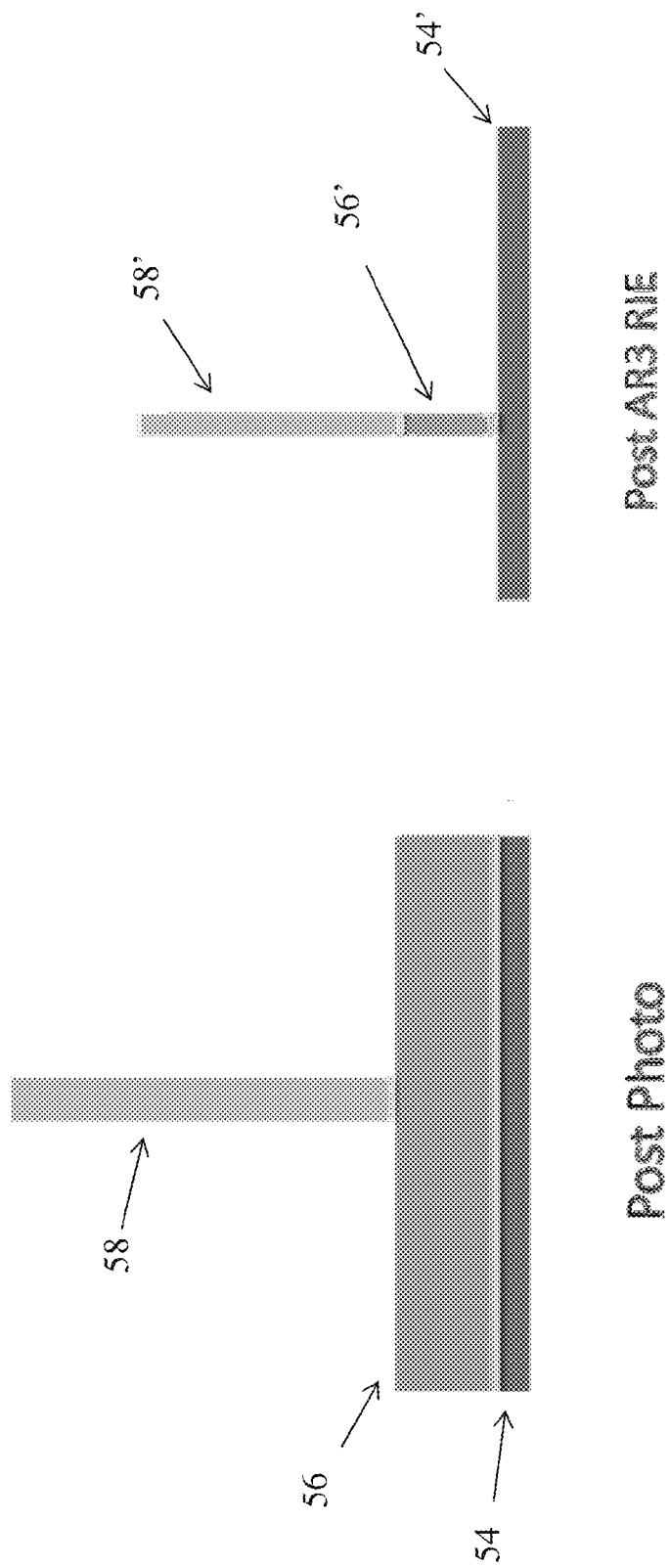
FIG. 5 illustrates a prior art method for preparing a milling mask using a non-developable organic bottom anti-reflective coating.

As described above, non-developable organic bottom anti-reflective coating based single layer photoresist masks have previously been used as sensor milling masks. In such methods, the photoresist is lithographically patterned and subjected to O2 plasma reactive ion etch (RIE). During the RIE process, the patterned photoresist experiences vertical etch and lateral trim during pattern transfer into the non-developable organic bottom anti-reflective coating. In other words, the height and cross-sectional width of a conventional non-developable organic bottom anti-reflective coating/photoresist line structure developed via such a method are both reduced during the RIE. This phenomenon is illustrated in FIG. 5. The structure labeled Post Photo shows a hard mask 54, a layer of non-developable BARC 56 (e.g., AR3), and a photoresist line 58. After RIE of the non-developable BARC 56', photoresist 58' (post-RIE) is has both a narrower cross section and a shorter height than photoresist 58 (pre-RIE). The resultant conventional non-developable organic bottom anti-reflective coating/photoresist line structure may then serve as milling mask for read sensor junction or NFT layer formation.

Such processes exhibit large variation in surface conditions of the resulting sensors, greatly depending on bias layer-sensor top step height and how aggressive CMP is conducted in preparing the final product.

A fabrication scheme using a novel junction milling mask that greatly reduces sensitivity to over-polishing is described herein. Instead of using a conventional non-developable organic bottom anti-reflective coating, the present methods use a developable-soluble bottom anti-reflective coating (such as D-BARC® from Brewer Science Inc.) in the formation of a mill mask. The present methods also employ a thin amorphous carbon (a-C) layer between the developable-soluble bottom anti-reflective coating layer and materials comprising the structure being manufactured.

Figure 6:
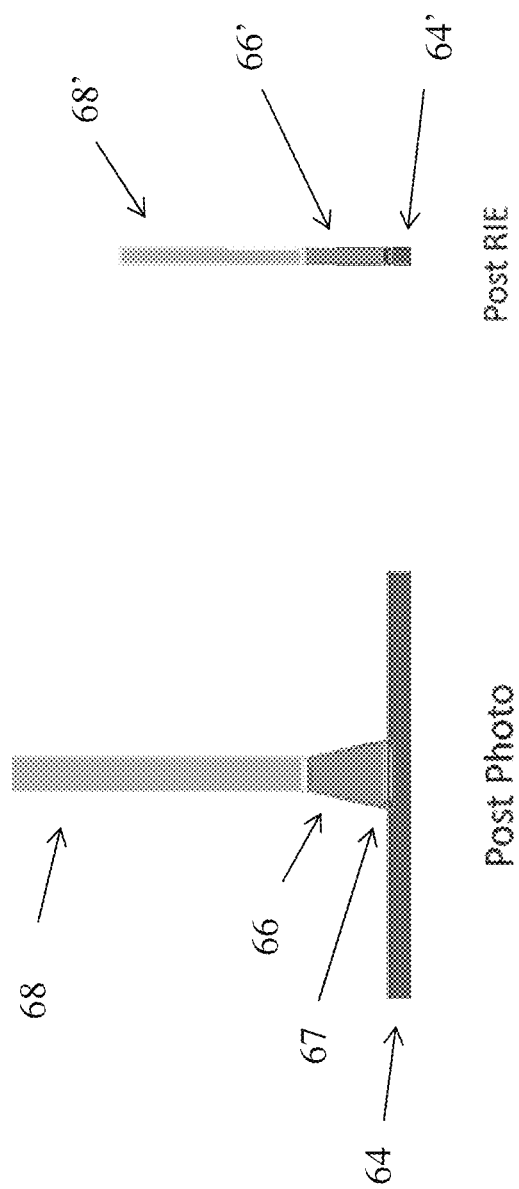
FIG. 6 illustrates an intermediate step of using the developable-soluble bottom anti-reflective according to an exemplary method of the present invention.

In some embodiments, after photolithography patterning, the developable-soluble bottom anti-reflective coating is intentionally under-developed to leave a "footing" to avoid air-bridge formation. This "footing" (67) is illustrated in FIG. 6, where the under-developed developable-soluble bottom anti-reflective coating has a cross-sectional width at the base (i.e., the end contacting the a-C layer 64 and 64') that is wider than the cross-sectional width at the top (i.e., the end contacting the photolithography layer (68 and 68'). Specifically, FIG. 6 shows a hard mask layer 64 (such as an a-C layer), a developable-soluble bottom anti-reflective coating 66 with footing 67, and a photoresist line structure 68. Subsequent O2 plasma RIE, or other suitable technique, vertically etches and laterally trims the photoresist 68', simultaneously trims the developable-soluble bottom anti-reflective coating 66' removing the footing 67, and transfers the pattern into the hard mask layer 64' (e.g., a-C layer) to form a narrow a-C line which can serve as a milling mask.

Figure 7:
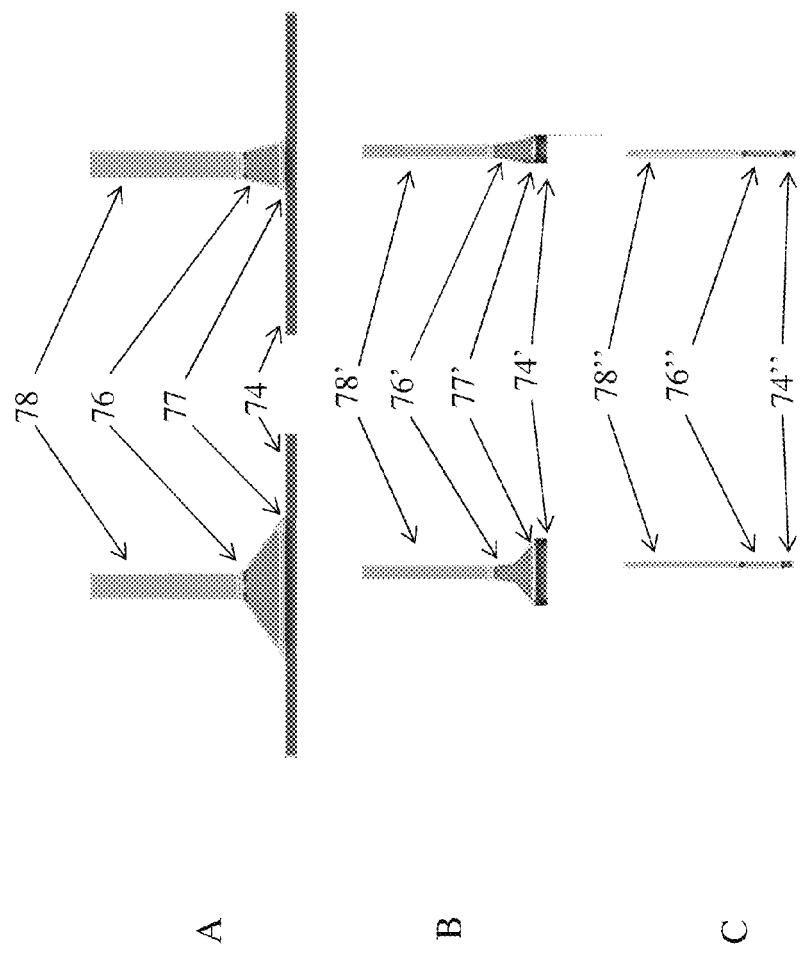
FIGS. 7A, B, and C illustrates the cross-sectional shapes of line structures at various stages of certain methods described herein.

Surprisingly, it has been found that the extent of the footing left in the developable-soluble bottom anti-reflective coating does not significantly impact the width of the final line structure. This is because RIE vertically trims the underdeveloped developable-soluble bottom anti-reflective coating at a faster rate than lateral etches the photoresist residing on top of developable-soluble bottom anti-reflective coating. Thus, the "footing" of the developable-soluble bottom anti-reflective coating is removed at a faster rate than the lateral etch of the photoresist. In this regard, RIE provides formation of a vertical narrow a-C/developable-soluble bottom anti-reflective coating/photoresist line structure regardless of initial "footing" thickness (as illustrated in FIG. 7). FIG. 7 depicts two examples with different footing thicknesses. Both examples show hard mask 74, developable-soluble bottom anti-reflective coating 76 with footing 77, and photoresist 78. As seen in the progression from pre-a-C RIE structures shown in A, to intermediate structures that exist during RIE shown in B, to fully etched structures shown in C, the developable-soluble bottom anti-reflective coating footing 77 is eliminated in both cases to result in substantially the same line structures shown in C.

It has been found that having an initial footing 77 the developable-soluble bottom anti-reflective coating 76 provides protection against undercutting, or over-narrowing, the developable-soluble bottom anti-reflective coating during RIE, or other suitable technique, where the developable-soluble bottom anti-reflective coating contacts the surface of the a-C layer 74.

As such, methods described herein ultimately utilize a-C as a milling mask and CMP stop. Due to the very low milling rate of a-C, a lower milling mask height can be used, thereby improving junction shape and free layer track width (FLTW) uniformity for formation of a read junction or NFT layer. After junction formation, the developable-soluble bottom anti-reflective coating is cleanly removed via solution based processes, and surface planarization can be confidently conducted via CMP with the remaining a-C layer on top of the sensor stack providing protection against over-polishing. Finally, the remaining a-C layer can be removed by O2 plasma RIE. As a result, much improved SSS targeting and control can be achieved because of the reduction or elimination of CMP over-polishing and the ability to achieve the same top surface height for both the sensor bridge and field areas.

Data presented Table 1 demonstrates the consistency in SSS targeting and control achieved using the disclosed developable-soluble bottom anti-reflective coating/a-C scheme without sacrificing other physical parameters. While the data presented in Table 1 shows preparation of read sensors with FLTW within the range of about 27 to 30 nm, preparation of narrower sensors is possible. For instance, the methods described herein have been used to prepare sensors with FLTW of about 24-25 nm. Even narrower read sensors, such as sensors with FLTW at or below 20 nm, are possible via these techniques.

TABLE 1

| Photo CD | Sigma | Post-RIE CD | Sigma | Post-RIE AFM (AFM-09) | Sigma | FLTW | Sigma | SSS Spacing | Sigma |
|---|---|---|---|---|---|---|---|---|---|
| 60.5 | 1.1 | 25.9 | 1 | 128 | 6.8 | 30.3 | 0.98 | 23.6 | 0.22 |
| 60 | 1.2 | 24.6 | 1.1 | 123.7 | 3.8 | 29.1 | 1.96 | 23.9 | 0.52 |
| 58.5 | 1.2 | 22.7 | 1.1 | 124.1 | 4.2 | 27.4 | 0.99 | 23.5 | 0.34 |
| 60 | 1 | 26.1 | 1 | 134.0 | 6.6 | 29.6 | 0.96 | 23.6 | 0.5 |
| 60.6 | 1.2 | 25.4 | 1.1 | 125.9 | 3.2 | 28.2 | 1.14 | 23.4 | 0.13 |

As shown in Table 2, the developable-soluble bottom anti-reflective coating/a-C scheme is very effective and has only one added step, as compared to a typical non-developable bottom anti-reflective coating scheme.

TABLE 2

|  | Typical Non-Developable BARC Process | Exemplary Developable-soluble BARC/a-C Process |
|---|---|---|
| Step 1 | TMR Deposition | TMR Deposition |
| Step 2 | n/a | 6 nm a-C deposition |
| Step 3 | Single Layer Photo (BARC (AR3)) | Single Layer Photo (Developable-soluble BARC) |
| Step 4 | AR3 RIE/Trim | a-C RIE/Trim |
| Step 5 | Junction Milling | Junction Milling |
| Step 6 | Soft Bias Refill | Soft Bias Refill |
| Step 7 | Lift off | Lift off |
| Step 8 | AR3 remove | CMP |
| Step 9 | CMP | a-C removal |
| Step 10 | Seed to seed space milling | Seed to seed space milling |

FIG. 8 shows SEM images of wafer HALAM at certain reader formation steps in the disclosed developable-soluble bottom anti-reflective coating/a-C scheme. Specifically, FIGS. 8A, B, and C show images taken at post liftoff, post CMP, and post a-C removal, respectively.

As will be appreciated by one of skill in the art, an a-C layer utilized in the methods above described may be applied to a substrate by any suitable technique (including e.g., vapor deposition) to any desired thickness. While the exemplary method seen in Table 2 indicates a 6 nm thick a-C layer, this is not intended to be limiting, with use of thinner or thicker layers (such as between about 3-10 nm) being possible.

Likewise, as will be appreciated by one of skill in the art, the methods described above may be utilized to provide a line structure as a mill mask on any suitable substrate. While the exemplary method seen in Table 2 indicates initial deposition of a tunneling magnetoresistive (TMR) stack on which a mill mask is then produced, this is not intended to be limiting, with use of any other desired material or structure being possible.

In the foregoing specification, embodiments of the disclosure have been described with reference to specific exemplary features thereof. It will, however, be evident that various modifications and changes may be made thereto without departing from the broader spirit and scope of the disclosure. The specification and figures are, accordingly, to be regarded in an illustrative rather than a restrictive sense.

That which is claimed is:

1. A method of making an amorphous carbon mill mask, the method comprising:
   depositing an amorphous carbon layer on a substrate surface;
   applying a developable-soluble bottom anti-reflective coating on at least a portion of an upper surface of the amorphous carbon layer;
   applying a photoresist layer on at least a portion of an upper surface of the developable-soluble bottom anti-reflective coating;
   developing the photoresist layer and the developable-soluble bottom anti-reflective coating to form a layered structure on an upper surface of the amorphous carbon layer, wherein the photoresist layer and developable-soluble bottom anti-reflective coating are developed under conditions such that the photoresist is developed into a line structure while the developable-soluble bottom anti-reflective coating is underdeveloped such that the developable-soluble bottom anti-reflective coating has a cross-sectional width that is approximately the same as the photoresist where the photoresist contacts the developable-soluble bottom anti-reflective coating, the developable-soluble bottom anti-reflective coating has a cross-sectional width that is wider than the photoresist where the developable-soluble bottom anti-reflective coating contacts the amorphous carbon layer; and
   performing a reactive ion etch of the amorphous carbon layer under conditions whereby the cross-sectional width of the photoresist and developable-soluble bottom anti-reflective coating decreases as the amorphous carbon is etched.

2. The method of claim 1, wherein the substrate comprises a tunneling magnetic resistive (TMR) material.

3. The method of claim 1, wherein the deposited amorphous carbon layer is about 3 to 10 nm thick.

4. A method of making a read junction for a read sensor, the method comprising:
   depositing an amorphous carbon layer on a tunneling magnetic resistive (TMR) substrate surface;
   applying a developable-soluble bottom anti-reflective coating on at least a portion of the amorphous carbon layer;
   applying a photoresist layer on at least a portion of the developable-soluble bottom anti-reflective coating;
   developing the photoresist layer and the developable-soluble bottom anti-reflective coating to form a layered structure on an upper surface of the amorphous carbon layer, wherein the photoresist layer and developable-soluble bottom anti-reflective coating are developed under conditions such that the photoresist is developed into a line structure while the developable-soluble bottom anti-reflective coating is underdeveloped such that the developable-soluble bottom anti-reflective coating has a cross-sectional width that is approximately the same as the photoresist where the photoresist contacts the developable-soluble bottom anti-reflective coating, the developable-soluble bottom anti-reflective coating has a cross-sectional width that is wider than the photoresist where the developable-soluble bottom anti-reflective coating contacts the amorphous carbon layer; and performing a reactive ion etch of the amorphous carbon under conditions whereby the width of the photoresist and developable-soluble bottom anti-reflective coating decreases as the amorphous carbon is etched.

5. The method of claim 4, wherein the deposited amorphous carbon layer is about 3 to 10 nm thick.

6. The method of claim 4, further comprising junction milling after performing the reactive ion etch of the amorphous carbon.

7. The method of claim 6, further comprising removing developable-soluble bottom anti-reflective coating from the remaining amorphous carbon via a solution based process after completion of junction milling.

8. The method of claim 7, further comprising chemical mechanical polishing or planarization.

9. The method of claim 7, further comprising removing the remaining amorphous carbon via reactive ion etching.

10. A read sensor comprising a read junction prepared according to the method of claim 4.

11. The read sensor of claim 10, wherein the read junction has a width of between about 15 and 30 nm.

12. The read sensor of claim 10, wherein the read junction has a width of between about 20 and 30 nm.

13. The read sensor of claim 10, wherein the read junction has a width of between about 20 and 25 nm.

* * * * *